(12) United States Patent
Cramaro

(10) Patent No.: US 9,862,256 B2
(45) Date of Patent: Jan. 9, 2018

(54) GUIDE UNIT FOR TARPAULIN COVER SYSTEM

(71) Applicant: CRAMARO TARPAULIN SYSTEMS, Melbourne, FL (US)

(72) Inventor: Michael Cramaro, Indian Harbour Beach, FL (US)

(73) Assignee: CRAMARO TARPAULIN SYSTEMS, Melbourne, FL (US)

( * ) Notice: Subject to any disclaimer, the term of this patent is extended or adjusted under 35 U.S.C. 154(b) by 0 days.

(21) Appl. No.: 15/067,363

(22) Filed: Mar. 11, 2016

(65) Prior Publication Data

US 2017/0259652 A1     Sep. 14, 2017

(51) Int. Cl.
*B60J 7/06*    (2006.01)

(52) U.S. Cl.
CPC .................................... *B60J 7/068* (2013.01)

(58) Field of Classification Search
CPC ..................................................... B60J 7/068
USPC ................................................... 296/100.12
See application file for complete search history.

(56) References Cited

U.S. PATENT DOCUMENTS

| | | | |
|---|---|---|---|
| 4,189,178 A | | 2/1980 | Cramaro |
| 4,289,346 A | | 9/1981 | Bourgeois |
| 5,076,174 A | | 12/1991 | Martin |
| 5,211,440 A | | 5/1993 | Cramaro |
| 5,240,304 A | | 8/1993 | Cramaro et al. |
| 5,253,914 A | * | 10/1993 | Biancale .................. B60J 7/062 160/84.06 |
| 6,007,138 A | | 12/1999 | Cramaro |
| 6,435,595 B1 | * | 8/2002 | Chenowth ................ B60J 7/062 296/100.11 |
| 6,447,044 B1 | | 9/2002 | Buker et al. |
| 6,616,211 B2 | | 9/2003 | Cramaro |
| 7,887,117 B2 | | 2/2011 | Pivetta |
| 8,864,212 B2 | | 10/2014 | Cramaro |
| 2002/0021018 A1 | | 2/2002 | Royer |
| 2009/0121514 A1 | | 5/2009 | Remmel et al. |
| 2009/0322116 A1 | | 12/2009 | Pivetta |
| 2010/0109373 A1 | | 5/2010 | Pivetta |

FOREIGN PATENT DOCUMENTS

| | | |
|---|---|---|
| CN | 101396983 A | 4/2009 |
| EP | 2075149 A1 | 7/2009 |
| EP | 2311678 A1 | 4/2011 |
| EP | 2371597 A1 | 10/2011 |
| WO | WO-2011077316 A1 | 6/2011 |

* cited by examiner

*Primary Examiner* — Joseph D Pape
*Assistant Examiner* — Dana Ivey
(74) *Attorney, Agent, or Firm* — Drinker Biddle & Reath LLP

(57) ABSTRACT

A tarpaulin cover system includes a drive unit for moving the tarpaulin selectively into covering and uncovering positions. The drive unit comprises first and second drive sprockets and a rotatable actuator sprocket with all of the sprockets spaced from and out of contact with each other. An idler sprocket is provided between the actuator sprocket and the drive sprockets. All of the sprockets are interconnected by a chain engaged with teeth with the chain extending partially around each sprocket whereby rotation of the actuator sprocket causes the drive sprockets to move in the intended directions. This motion is transmitted to drive pulleys which drive cables to control the position of the tarpaulin.

11 Claims, 5 Drawing Sheets

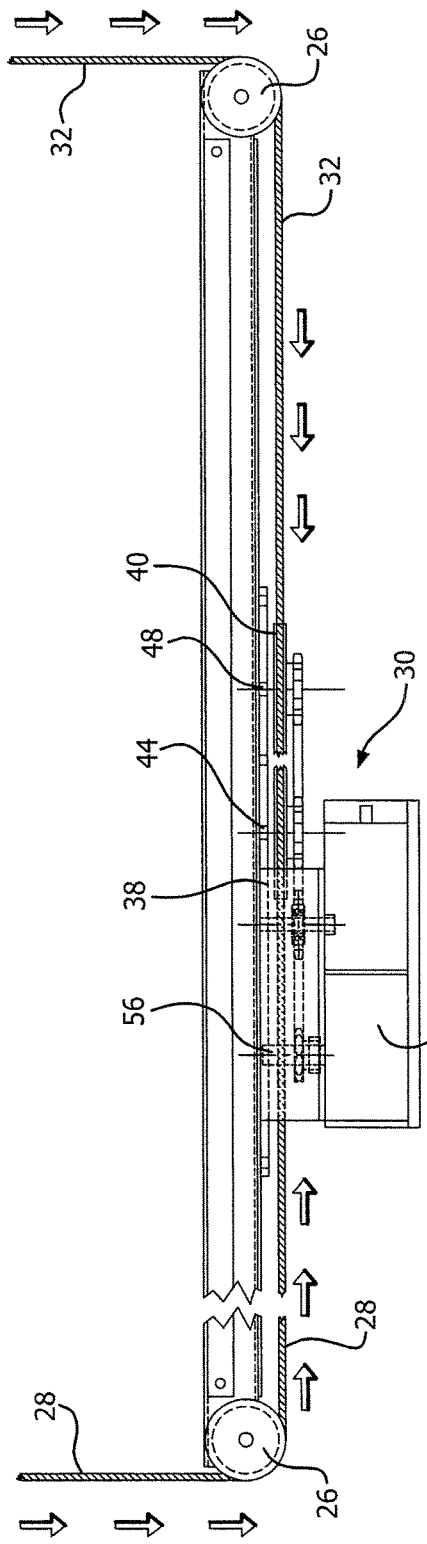
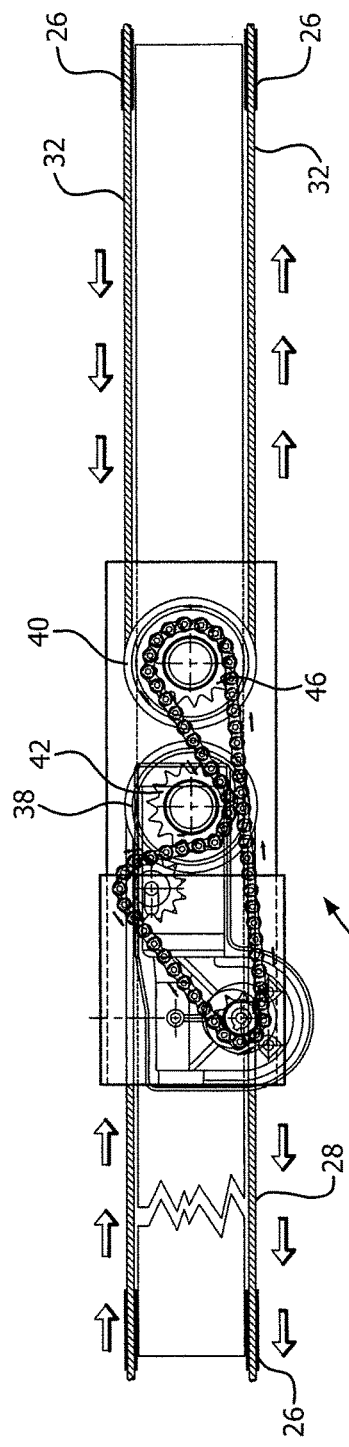
FIG. 3
FIG. 2

GUIDE UNIT FOR TARPAULIN COVER SYSTEM

BACKGROUND OF THIS INVENTION

Open top containers, such as vehicle bodies, are often used to store or transport dry bulk materials. These types of containers or vehicles are easy to load and unload because the upper portion of the container is open or not covered. There are risks, however, when using open top containers or vehicle bodies if the contents are exposed, for example, to weather and transport-related conditions. As a result, many open top containers or vehicle bodies are provided with tarpaulin cover systems. Sometimes such systems use drive units in order to selectively retract (uncover) and extend (cover) a tarpaulin over the open top container.

U.S. Pat. No. 8,864,212, ("'212 patent") all of the details of which are incorporated herein by reference thereto, discloses drive units for tarpaulin cover systems. In general, these drive units include a gear arrangement for controlling the selective covering and uncovering of the open top container. The drive unit is used with a cover system operating along the lines of U.S. Pat. No. 4,189,178, all of the details of which are incorporated herein by reference thereto. In such cover system a plurality of support rods span opposite side walls of the truck body or container. A flexible tarpaulin is mounted to the support rods. An endless cable is located at each of the side walls for rotation around pulleys at each of the front end and back end of the container. One of the rods is fastened to each of the cables so that when the cable is moved in either a clockwise or counterclockwise direction the fastened rod moves with the cable in a covering or uncovering direction. As the fastened rod moves, it pushes the tarpaulin and other rods toward one end of the container to expose the open top. Conversely, when the fastened rod is moved in the opposite direction, it pulls the tarpaulin and the other rods toward the opposite end of the container so that the tarpaulin covers the container. The drive units shown in the '212 patent generally include intermeshing gears which control the movement of the cables.

SUMMARY OF THE INVENTION

An object of this invention is to provide a drive unit for a tarpaulin cover system which differs from the gear arrangements disclosed in the '212 patent.

A further object of this invention is to provide such a drive unit which may effectively selectively cover or uncover the open top of a container.

In accordance with this invention the drive unit comprises a first drive pulley around which one of the cables is mounted and a second drive pulley for the other cable. The drive pulleys are mounted to reversibly rotatable drive sprockets which are spaced from and out of contact with each other. A reversibly rotatable actuator sprocket is spaced from and out of contact with the drive sprockets. A chain is mounted partially around and in engagement with all of these sprockets whereby rotation of the actuator sprocket causes the two drive sprockets to rotate and to move the two drive pulleys and their cables in opposite directions.

The drive unit also preferably includes an idler sprocket between the actuator sprocket and one of the drive sprockets. The chain is also partially around and in contact with the teeth of the idler sprocket.

In a preferred embodiment of this invention the idler sprocket has its shaft slidably mounted in a slot to adjust the tension of the chain. Once the idler sprocket is in its desired position it may be held in place against further sliding movement until later desired if tension adjustment is again needed.

THE DRAWINGS

FIG. 2 is a front elevation view of a preferred embodiment of this invention using a motorized drive;

FIG. 3 is a top plan view of the portion of the system shown in FIG. 2;

DETAILED DESCRIPTION

Figure 1:
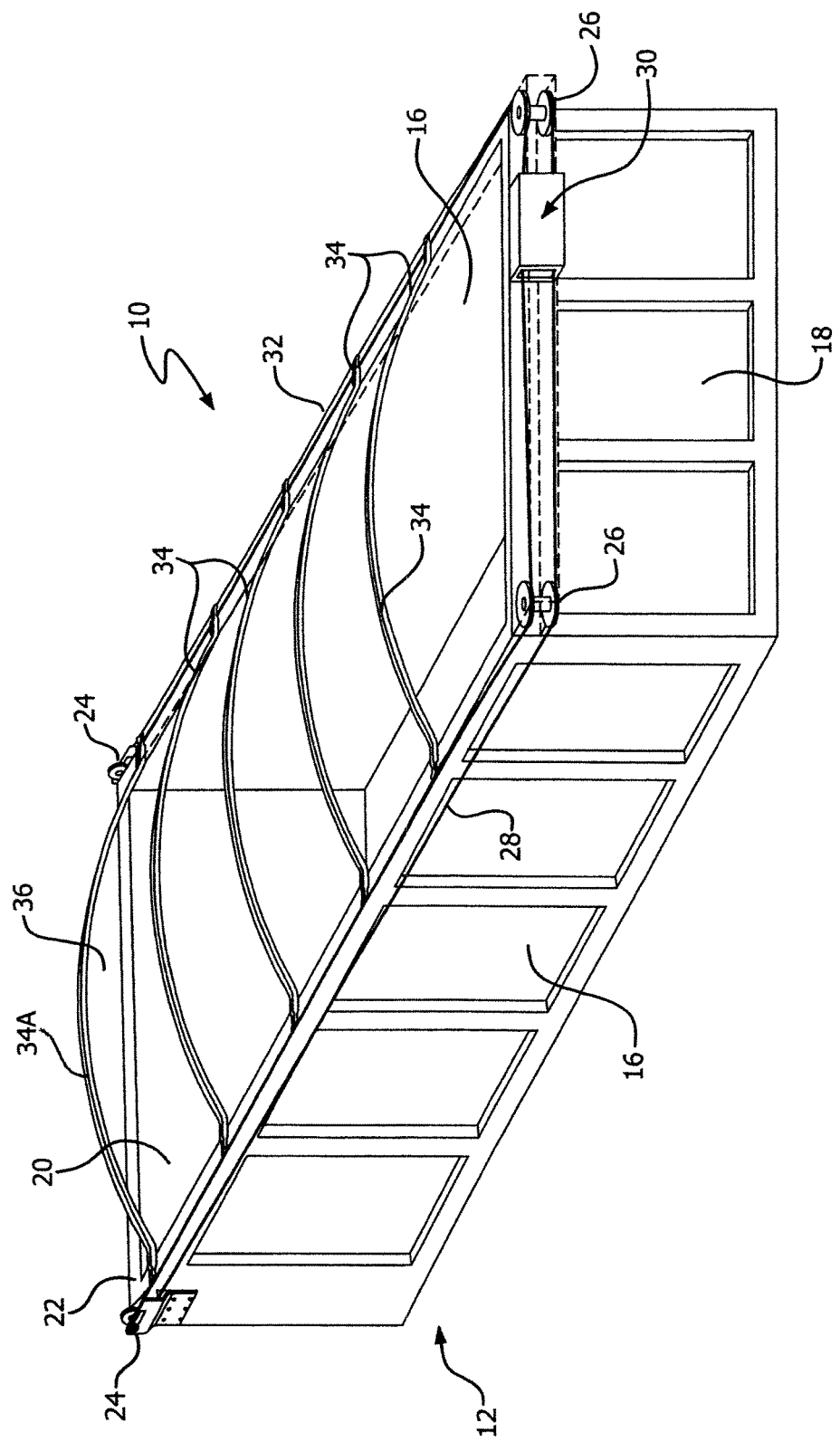
FIG. 1 is a perspective view of a tarpaulin cover system using a drive unit in accordance with one embodiment of this invention.
Figure 6:
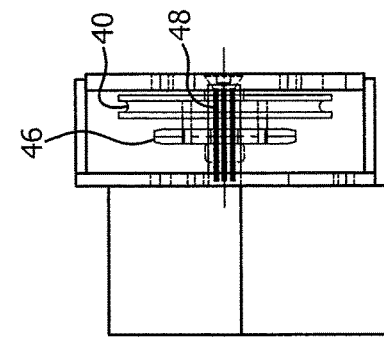
FIG. 6 is a side elevation view of the portion of the system shown in FIGS. 4-5.
Figure 5:
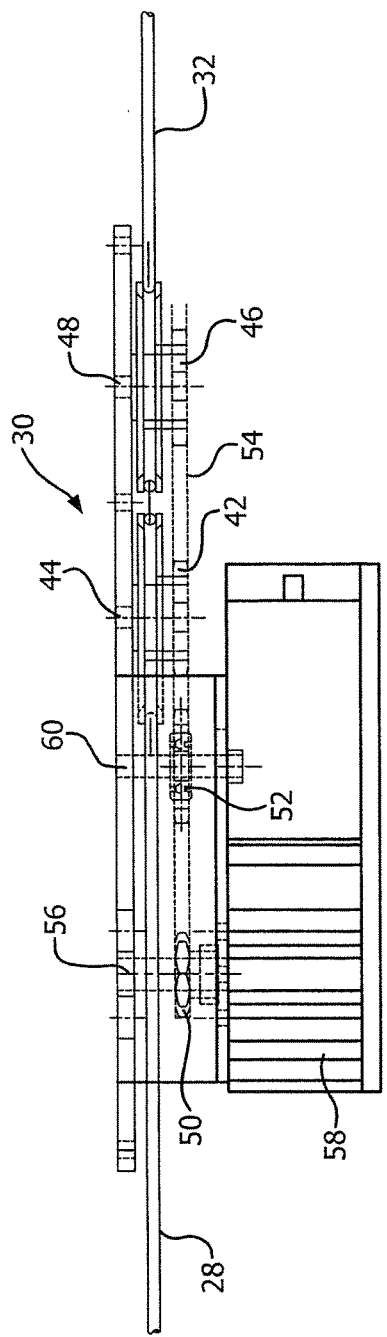
FIG. 5 is a top plan view of the portion of the system shown in FIG. 4.

FIG. 1 shows a tarpaulin cover system 10 mounted on an open top container 12, such as a vehicle body. Container 12 has a pair of opposite side walls 16,16, a front wall 18 and a rear wall 20. These walls have a continuous peripheral upper wall 22. A pair of pulleys 24,24 is mounted at the junction or corner of side walls 16 and rear wall 20. Similarly, a pair of pulleys 26,26 is mounted at the junction of side walls 16 and front wall 18. An endless cable 28 is mounted around one set of pulleys 24,26 and extends into the drive unit 30 on one side of container 12. A second endless cable 32 is mounted around the other set of pulleys 24,26 and extends into drive unit 30. A plurality of support rods 34 spans the opposite side walls 16. One of the support rods 34A located furthermost from drive unit 30 is fastened to each of the cables 28,32. Support rod 34A may be considered a lead rod. The other support rods 34 are slidably mounted to cables 28,32. A flexible tarpaulin 36 is fastened to the support rods 34,34A. The thus described arrangement is generally known in the art, as generally shown in U.S. Pat. No. 4,189,178.

FIGS. 2-6 illustrate one embodiment of this invention for the drive unit 30. As shown therein, cable 28 is mounted around a drive pulley 38 while cable 32 is mounted around a drive pulley 40. Drive pulley 38 is coaxially mounted to a drive sprocket 42 on common shaft 44. Drive sprocket 42 is reversibly rotatable. Thus, when drive sprocket 42 is rotated in one direction, drive pulley 38 is correspondingly rotated in the same direction. Drive pulley 40 is coaxially mounted to drive sprocket 46 on common shaft 48. Similarly, when the reversibly mounted drive sprocket 46 is rotated, drive pulley 40 is correspondingly rotated in the same direction.

As also illustrated, a reversibly rotatable actuator sprocket 50 is mounted spaced from and out of contact with the first and second drive sprockets 42,46 and their first and second drive pulleys 38,40. Similarly, the drive sprockets 42,46 are spaced from and out of contact with each other. Drive unit 30 also includes an idler sprocket 52 mounted between, but spaced from and out of contact with actuator sprocket 50 and first drive sprocket 42. An endless chain 54 extends partially around each of the sprockets 42,46,50 and 52 and is engaged with the teeth in each sprocket. Actuator sprocket 50 is mounted to shaft 56 of motor 58. Motor 58 may take any suitable form and is reversible to control the direction of rotation of actuator sprocket 50.

Motor 58 could be controlled in any suitable manner including from proper circuitry having the control means located in the cab of a vehicle or at any other suitable location such as adjacent the drive unit 30 at the front wall 18 of container 12.

When motor 58 is actuated, chain 54 by being partially around each of the sprockets is moved by the simultaneous rotation of drive sprocket 50. The rotation of chain 54 thereby causes the first and second drive sprockets 42 and 46 to rotate in opposite directions. In turn, the first and second drive pulleys 38,40 cause the cables 28,32 to rotate in opposite directions. This, in turn, moves the lead support rod 34A toward or away from the front wall 18 depending upon the direction of rotation of the sprockets. When lead rod 34A is moved away from front wall 18 and toward rear wall 20 the attached tarpaulin is moved with rod 34A and the remaining rods 34 are also pulled toward the rear wall 20 to thereby cover or close the top 22 of container 12. Conversely, when lead rod 34A is moved away from rear wall 20 toward front wall 18 the tarpaulin opens or exposes the open top of container 12. Thus motor 58 is the drive unit actuator.

Figure 4:
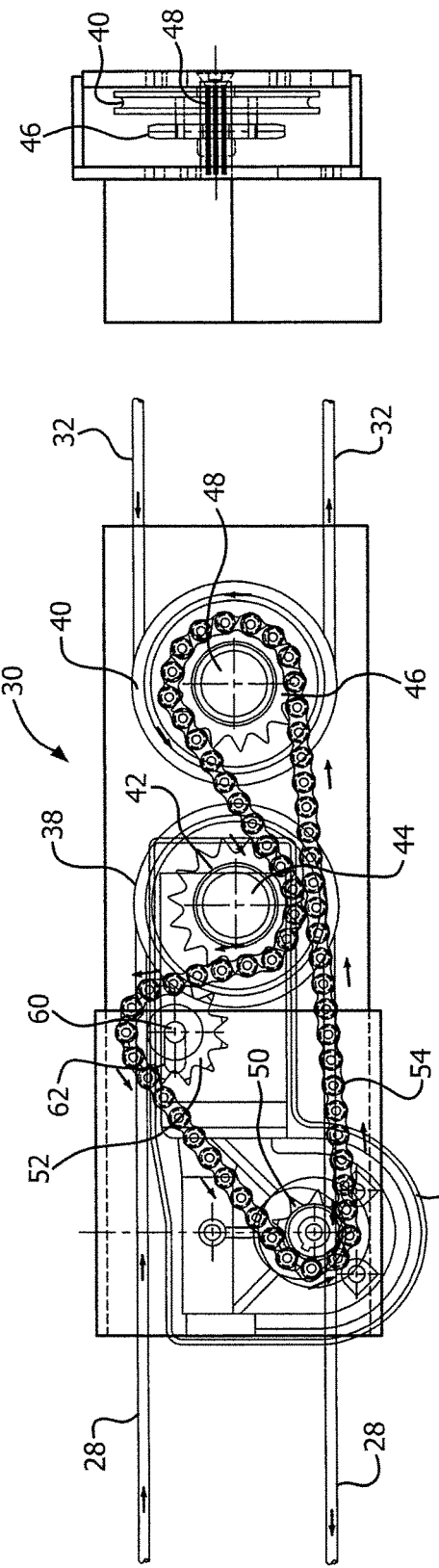
FIG. 4 is a front elevation view of a portion of the system shown in FIGS. 2-3.

As illustrated in FIG. 4, idler sprocket 52 is mounted on a shaft 60 which extends through a slot 62 in a suitably located wall in drive unit 30. Shaft 60 can be moved within the slot 62 to adjust the tension of chain 54. This prevents the chain 54 from thereby slipping. Once shaft 60 is moved to the desired location it can be held in place in any suitable manner such as by tightening a bolt on shaft 60 against a wall in drive unit 30. Chain 54 operates to drive the various components in their proper directions without slippage. Such adjustment of shaft 60 is one practice of the invention. Alternatively, if during assembly the chain 54 is sufficiently tight, shaft 60 could be inserted through a fixed hole, rather than an elongated slot, since adjustability would not be necessary.

As shown in FIG. 4 the idler sprocket 52 is located a vertical distance greater/higher than the location of drive sprockets 38,40. Drive sprockets 38 and 40 are at the same elevation as each other. Actuator sprocket 50 is located a vertical distance below all of the other sprockets.

Figure 7:
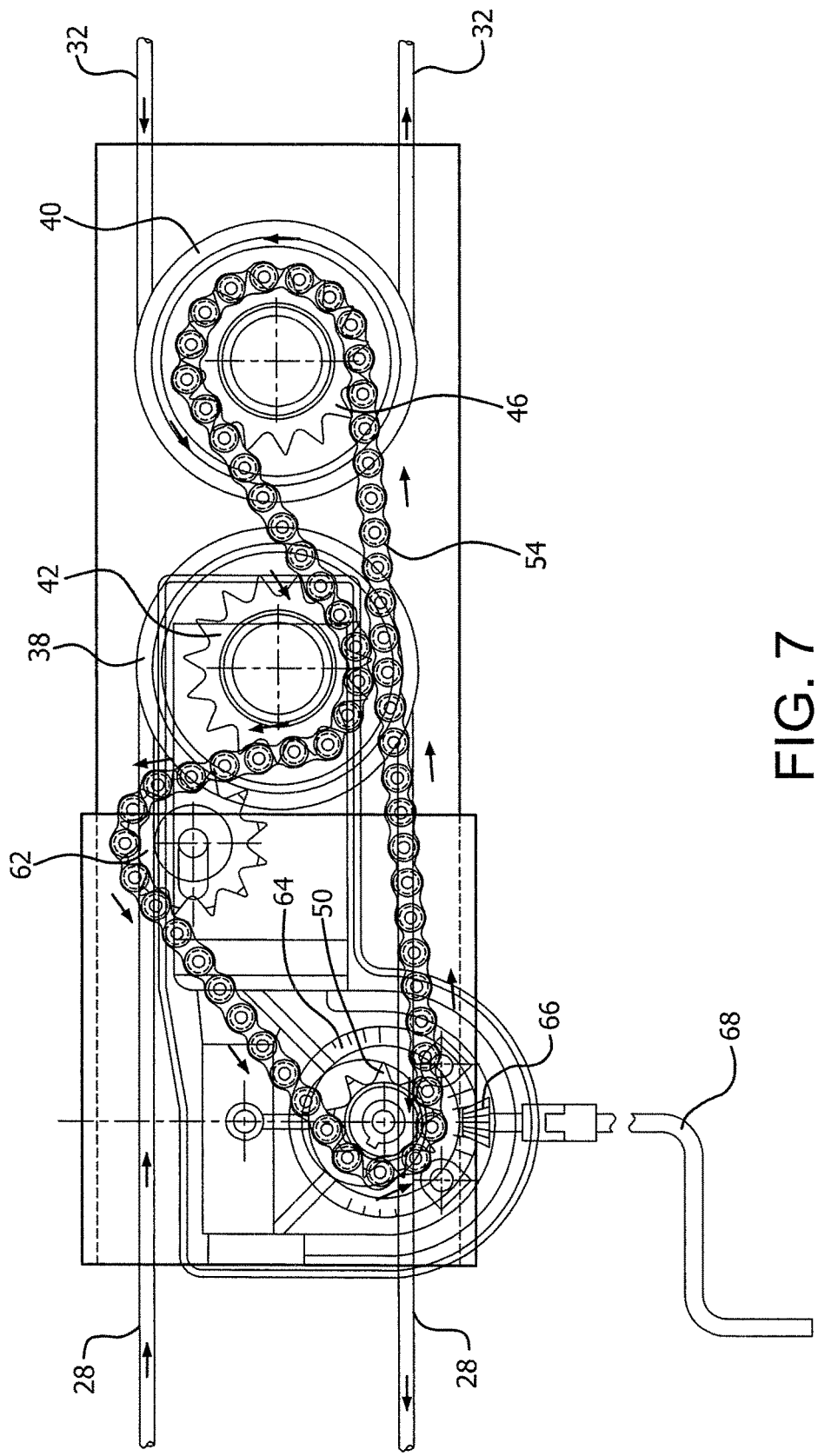
FIG. 7 is a front elevation view of a manually operated drive system in accordance with a further embodiment of this invention.
Figure 8:
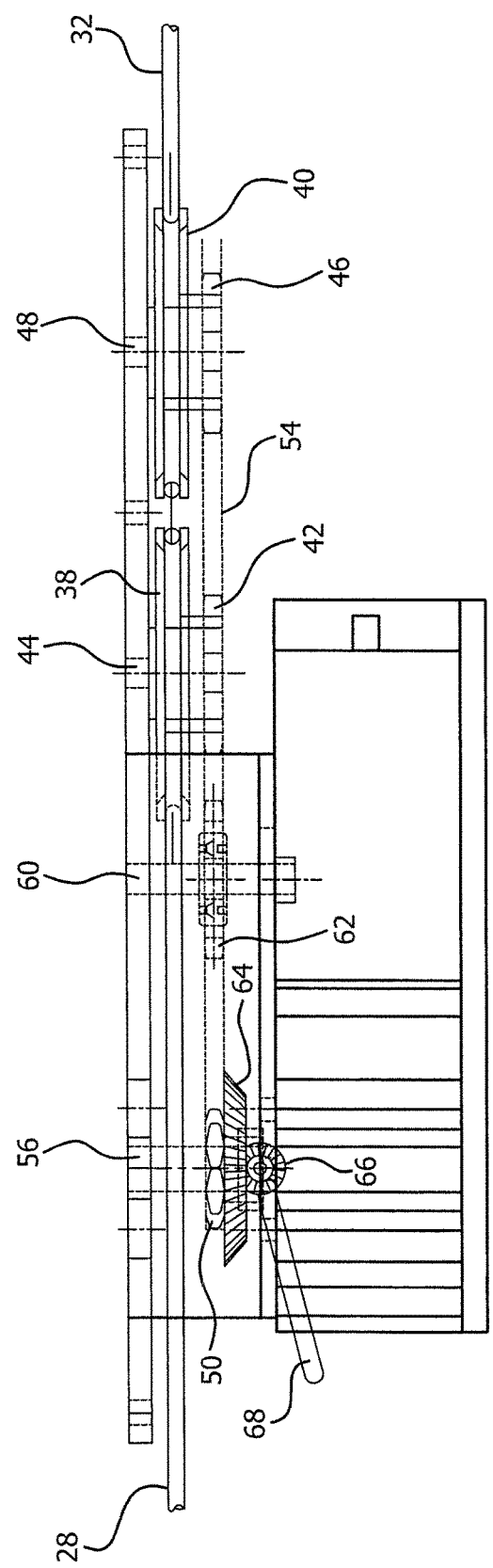
FIG. 8 is a top plan view of the system shown in FIG. 7.

FIGS. 7-8 illustrate a modified form of actuation for the drive unit. As shown therein, the actuation is done manually through a crank. This can be an alternative to or a replacement for the motorized actuation of FIGS. 2-6. Preferably only one drive mechanism would be provided. The invention, however, can be practiced by providing both drive mechanism and the user could select which would be used by suitably inactivating the mechanism not used.

As shown in FIGS. 7-8 a beveled gear 64 is coaxially mounted to sprocket 50. Beveled gear 64 meshes with beveled gear 66 at the end of crank 68. In practice when it is desired to either cover or uncover the top of container 12, a user would grasp crank 68 and rotate the actuator crank in the desired covering or uncovering direction. This rotational movement of crank 68 causes rotation of bevel gear 66 which, in turn, rotates bevel gear 64 coaxially mounted to actuator sprocket 50. As a result, the chain 54 rotates the various sprockets and pulleys in the desired directions, as previously described.

As should be apparent, the use of a chain as part of the drive mechanism for the drive unit provides an effective manner of moving all of the components in the drive unit and in the tarpaulin cover system in the proper directions to thereby effectively, selectively cover or uncover the top of an open top container.

What is claimed is:

1. In a tarpaulin cover system for selectively covering and uncovering the top of an open top container having a first side wall and an opposite second side wall between a front end and a back end, a plurality of support rods spanning the opposite side walls, a flexible tarpaulin mounted to the support rods, a first endless cable located at the first side wall for rotation around a first front end pulley at the front end and a first back end pulley of the back end, a second endless cable separate and distinct from the first endless cable, the second endless cable being located at the second side wall for rotation around a second front end pulley at the front end and a second back end pulley at the back end, one of the rods being a lead rod fastened to each of the cables, and a drive unit for rotating the cables, the improvement being in that the drive unit comprises a first drive pulley around which one of the cables is mounted to selectively move the one cable clockwise and counterclockwise, a second drive pulley around which the other of the cables is mounted to selectively move the other cable clockwise and counterclockwise, the first drive pulley being mounted to a first reversibly rotatable drive sprocket whereby rotation of the first drive sprocket causes the first drive pulley to rotate, the second drive pulley being mounted to a second reversibly rotatable drive sprocket whereby rotation of the second drive sprocket causes the second drive pulley to rotate, the first drive sprocket and the second drive sprocket being spaced from and out of contact with each other, a reversibly rotatable actuator sprocket being spaced from and out of contact with the first drive sprocket and the second drive sprocket, a chain mounted partially around and in engagement with sprocket teeth on the actuator sprocket and the first drive sprocket and the second drive sprocket, and an actuator mounted to the actuator sprocket to selectively rotate the actuator sprocket clockwise and counterclockwise with the chain causing the first drive sprocket and the second drive sprocket to simultaneously rotate in opposite directions.

2. The system of claim 1 wherein the actuator sprocket is driven by a motor, and the motor being the actuator.

3. The system of claim 1 wherein the rotation of the actuator sprocket is controlled by a manual crank, and the crank is the actuator.

4. The system of claim 1 wherein the first drive pulley is separate from and coaxially mounted to the first drive sprocket, and the second drive pulley being separate from and coaxially mounted to the second drive sprocket.

5. In a tarpaulin cover system for selectively covering and uncovering the top of an open top container having opposite side walls between a front end and a back end, a plurality of support rods spanning the opposite side walls, a flexible tarpaulin mounted to the support rods, an endless cable located at each of the side walls for rotation around a pulley at each of the front end and the back end, one of the rods being a lead rod fastened to each of the cables, and a drive unit for rotating the cables, the improvement being in that the drive unit comprises a first drive pulley around which one of the cables is mounted to selectively move the one cable clockwise and counterclockwise, a second drive pulley around which the other of the cables is mounted to selectively move the other cable clockwise and counterclockwise, the first drive pulley being mounted to a first reversibly rotatable drive sprocket whereby rotation of the first drive sprocket causes the first drive pulley to rotate, the second drive pulley being mounted to a second reversibly rotatable drive sprocket whereby rotation of the second drive sprocket causes the second drive pulley to rotate, the first drive sprocket and the second drive sprocket being spaced from and out of contact with each other, a reversibly rotatable actuator sprocket being spaced from and out of contact with the first drive sprocket and the second drive sprocket, a chain mounted partially around and in engagement with sprocket teeth on the actuator sprocket and the first drive sprocket and the second drive sprocket, an actuator mounted to the actuator sprocket to selectively rotate the actuator sprocket clockwise and counterclockwise with the chain causing the first drive sprocket and the second drive sprocket to simultaneously rotate in opposite directions, including an idler sprocket mounted between the actuator sprocket and one of the drive sprockets spaced from an out of contact with the actuator sprocket and the drive sprockets, and the chain extending partially around the idler sprocket.

6. The system of claim 5 wherein the idler sprocket is mounted on a shaft slidably located in a slot to permit adjustment of the position of the idler sprocket for adjusting the tension of the chain to prevent slippage of the chain.

7. The system of claim 5 wherein the actuator sprocket is driven by a motor, and the motor being the actuator.

8. The system of claim 5 wherein the actuator sprocket is rotated by a manual crank, and the crank being the actuator.

9. The system of claim 5 wherein the drive unit is located at the front end of the container.

10. The system of claim 9 wherein the container is a vehicle body.

11. The system of claim 5 wherein the chain is an endless chain, the idler sprocket being located at a vertical distance greater than the location of the first drive sprocket, and the second drive sprocket and the actuator sprocket being located at a vertical distance below the first drive sprocket and the second drive sprocket.

* * * * *